United States Patent
Ibrahim et al.

(10) Patent No.: US 10,093,157 B2
(45) Date of Patent: Oct. 9, 2018

(54) TWO-STAGE SUN VISOR MOUNTING SYSTEM AND METHOD

(71) Applicant: Honda Motor Co., Ltd., Tokyo (JP)

(72) Inventors: Christina M Ibrahim, Ostrander, OH (US); Matthew R Schlater, Dublin, OH (US); Toshimasa Takeuchi, Dublin, OH (US); Troy M Medlar, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/448,877

(22) Filed: Mar. 3, 2017

(65) Prior Publication Data

US 2018/0251013 A1 Sep. 6, 2018

(51) Int. Cl.
*B60J 3/02* (2006.01)
*B62D 65/02* (2006.01)

(52) U.S. Cl.
CPC .......... *B60J 3/0213* (2013.01); *B60J 3/0217* (2013.01); *B62D 65/02* (2013.01)

(58) Field of Classification Search
CPC ...... B60J 3/0213; B60J 3/0217; B60J 3/0221; B60J 3/023; B62D 65/02; B62D 65/14
USPC ....................................................... 296/97.9
See application file for complete search history.

(56) References Cited

U.S. PATENT DOCUMENTS

| | | | |
|---|---|---|---|
| 5,098,151 A | 3/1992 | Peterson | |
| 5,507,545 A * | 4/1996 | Krysiak | B60J 3/023 24/453 |
| 5,967,589 A | 10/1999 | Spadafora | |
| 6,007,136 A | 12/1999 | Von Zittwitz et al. | |
| 6,179,366 B1 * | 1/2001 | Hansz | B60J 3/023 248/27.3 |
| 6,398,295 B2 * | 6/2002 | Asai | B60J 3/0221 296/146.7 |

(Continued)

FOREIGN PATENT DOCUMENTS

| | | |
|---|---|---|
| DE | 4341093 A1 | 6/1994 |
| DE | 102009058815 A1 | 6/2011 |

(Continued)

OTHER PUBLICATIONS

"Sun Visor Light Wire Fix" http://forums.vwvortex.com/showthread.php?4986213-DIY-Sun-Visor-Light-Wire-Fix.

*Primary Examiner* — Gregory A Blankenship
(74) *Attorney, Agent, or Firm* — Honda Patents & Technologies North America, LLC; Mark E. Duell (57) ABSTRACT

A mounting system mounts an accessory to a body member of a vehicle. The body member defines an opening and includes a base inserted into the opening. The mounting system includes a hook-shaped first engagement feature engaging the body member and a base aperture. A clip is disposed within the base aperture and the body member defines a second engagement feature. The clip includes two pairs of legs connected at a top portion of the clip, and two flexible tab members extending from the top portion of the clip biased outwardly between the legs into engagement with the inner edge of the body member. A cap includes a cap base and a plunger extending from a central portion of a first side of the cap base. The plunger abuts the flexible tab members, maintaining the flexible tab members in engagement with the body member.

17 Claims, 13 Drawing Sheets

(56) References Cited

U.S. PATENT DOCUMENTS

| | | | |
|---|---|---|---|
| 6,517,039 B1* | 2/2003 | Arisaka | B60J 3/0221 248/231.81 |
| 6,726,165 B2* | 4/2004 | Sawayanagi | B60J 3/0217 248/224.8 |
| 6,857,168 B2* | 2/2005 | Lubera | B60N 3/026 24/293 |
| 6,969,100 B2* | 11/2005 | Totani | B60N 3/023 16/110.1 |
| 7,415,751 B2* | 8/2008 | Kato | B60N 3/023 16/110.1 |
| 7,575,267 B2 | 8/2009 | Nakajima et al. | |
| 7,967,360 B2 | 6/2011 | Holden et al. | |
| 8,950,042 B2 | 2/2015 | Smith et al. | |
| 9,488,209 B2* | 11/2016 | Camus | F16B 21/075 |
| 2008/0309115 A1* | 12/2008 | Nakajima | B60J 3/0221 296/97.9 |
| 2009/0309384 A1* | 12/2009 | Huff | B60J 3/0221 296/97.9 |
| 2011/0163562 A1 | 7/2011 | Smith et al. | |
| 2012/0228896 A1* | 9/2012 | Medlar | B60J 1/2047 296/97.9 |
| 2015/0211565 A1 | 7/2015 | Benedetti et al. | |
| 2015/0321622 A1 | 11/2015 | Dickinson et al. | |
| 2016/0016522 A1 | 1/2016 | Smith et al. | |

FOREIGN PATENT DOCUMENTS

| | | |
|---|---|---|
| DE | 102013206461 A1 | 10/2014 |
| DE | 102014017332 A1 | 6/2015 |
| FR | 2782954 A1 | 3/2000 |
| GB | 1468954 A1 | 3/1977 |
| JP | 2010042787 A1 | 2/2010 |
| WO | 201576892 A1 | 5/2015 |

* cited by examiner

SECTION A-A
FIG. 7

SECTION B-B
FIG. 18

TWO-STAGE SUN VISOR MOUNTING SYSTEM AND METHOD

TECHNICAL FIELD

The embodiments described herein are directed to a system for mounting a component part to a motor vehicle in multiple stages.

BACKGROUND

In the past, sun visor mounting systems were complicated to install, with assembly workers required to insert clips, screws, bolts, or other fasteners in order to successfully install the assembly. It would often be difficult for an assembly worker to determine if the sun visor was properly set due to the twisting or overstroking that often occurred in the assembly process. A simplified mounting system was required to lessen the assembly time required to install the sun visor. Additionally, a sun visor mounting assembly with the fasteners pre-attached may substantially lessen the time for assembly of the sun visor to the motor vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a mounting system for attaching an accessory to a body member of a motor vehicle, the body member having an inner edge defining an opening within the body member includes a base for inserting into the opening of the body member, including a hook-shaped first engagement feature, the first engagement feature in engagement with the body member of the motor vehicle, and a base aperture. A clip is disposed within the base aperture and the body member of the motor vehicle, the clip defining a second engagement feature, including a first pair of legs, a second pair of legs connected to the first pair legs at a top portion of the clip, and first and second flexible tab members extending from the top portion of the clip biased outwardly between the first and second pairs of legs into engagement with the inner edge of the body member. A cap includes a cap base and a plunger extending from a central portion of a first side of the cap base, the plunger inserted into the base aperture and into the clip, the plunger abutting the flexible tab members, thereby maintaining the flexible tab members in engagement with the body member.

According to another aspect, a mounting system for attaching an accessory to a body member of a motor vehicle, the body member having an inner edge defining an opening within the body member includes a base inserted into the opening of the body member having a base aperture and a clip disposed within the base aperture and the body member of the motor vehicle. The clip includes a first pair of legs, a second pair of legs connected to the first pair legs at a top portion of the clip, and first and second flexible tab members extending from the top portion of the clip biased outwardly between the first and second pairs of legs into engagement with the inner edge of the body member. The system also includes a cap that includes a cap base and a plunger extending from a central portion of a first side of the cap base, the plunger inserted into the base aperture and into the clip, the plunger abutting the flexible tab members, thereby maintaining the flexible tab members in engagement with the body member.

According to yet another aspect, a method of attaching an accessory to a body member of a motor vehicle, the body member having an inner edge defining an opening within the body member, includes the steps of inserting a base having a hook-shaped first engagement feature and a base aperture into opening with the body member, rotating the first engagement feature in engagement with the body member of the motor vehicle, and inserting a clip into the base aperture and the body member of the motor vehicle, the clip defining a second engagement feature.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
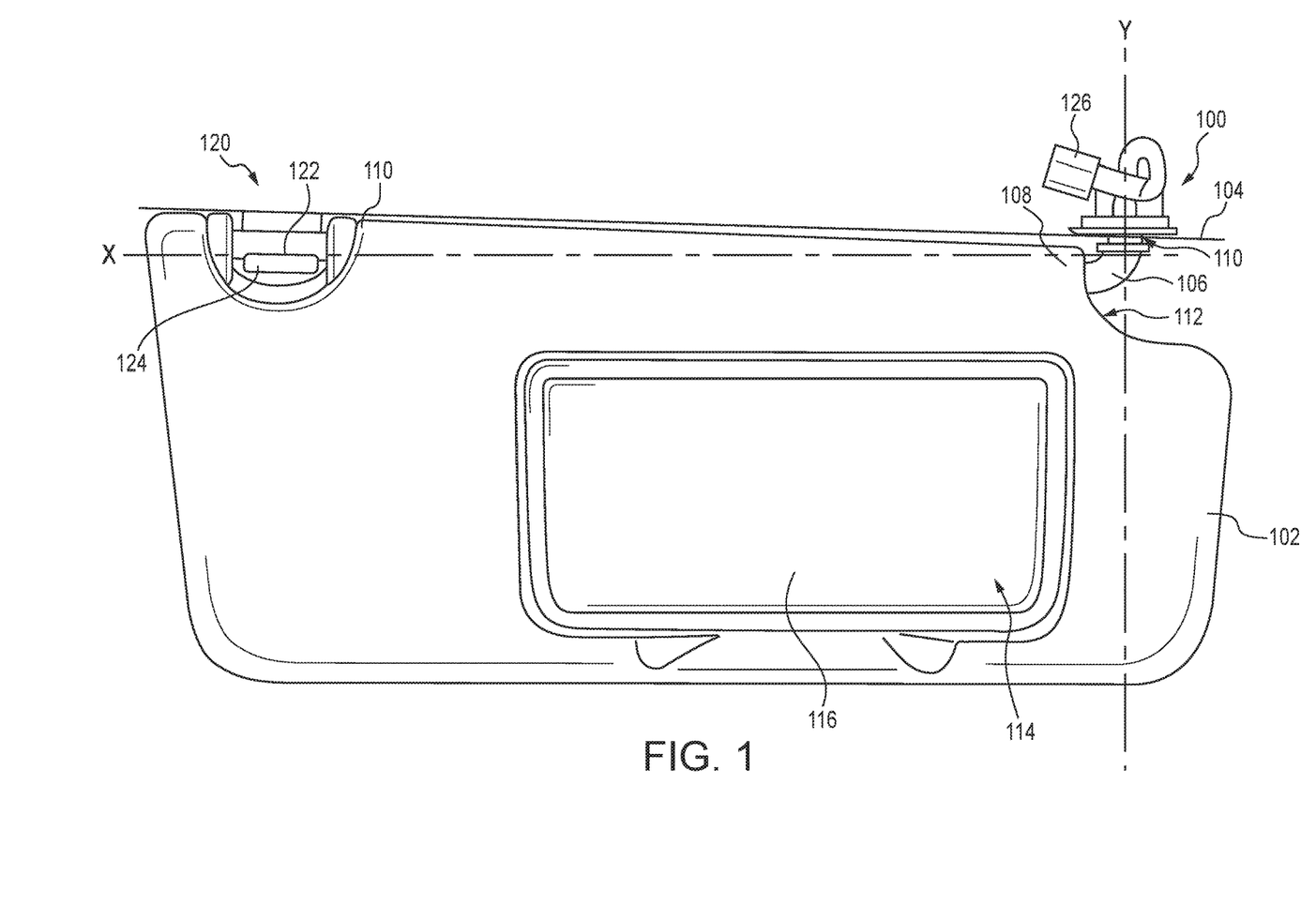
FIG. 1 is front view of a sun visor for a motor vehicle.

FIG. 1 illustrates a mounting system 100 for a component in a body member of a motor vehicle. The embodiment illustrated, specifically, is a mounting system 100 for a sun visor 102 to the roof 104 of a motor vehicle. As illustrated, the sun visor 102 includes a rod 106 across the top edge 108 of the sun visor 102. The sun visor 102 typically has one fixed mounting location 110 on the roof 104 located at a first upper corner 112 of the sun visor 102. The sun visor 102 is rotatable about an x-axis to raise and lower the sun visor 102 and a y-axis to move the sun visor 102 from coverage over a front window to a side window. Additionally, a wiring harness 126 may be located within the roof 104, to provide wiring through rod 106 to the sun visor 102, which in turn enables lights in the visor mirror 114 to be operated when the mirror cover 116 is raised. The sun visor 102, in a second upper corner 118, may include a detachable mount 120, which enables the rotation of the sun visor 102 from a first position covering a part of the windshield to a second position covering a part of the side window. In the embodiment illustrated, a bar 122 is in detachable engagement with a hook 124 attached to the roof 104.

Figure 2:
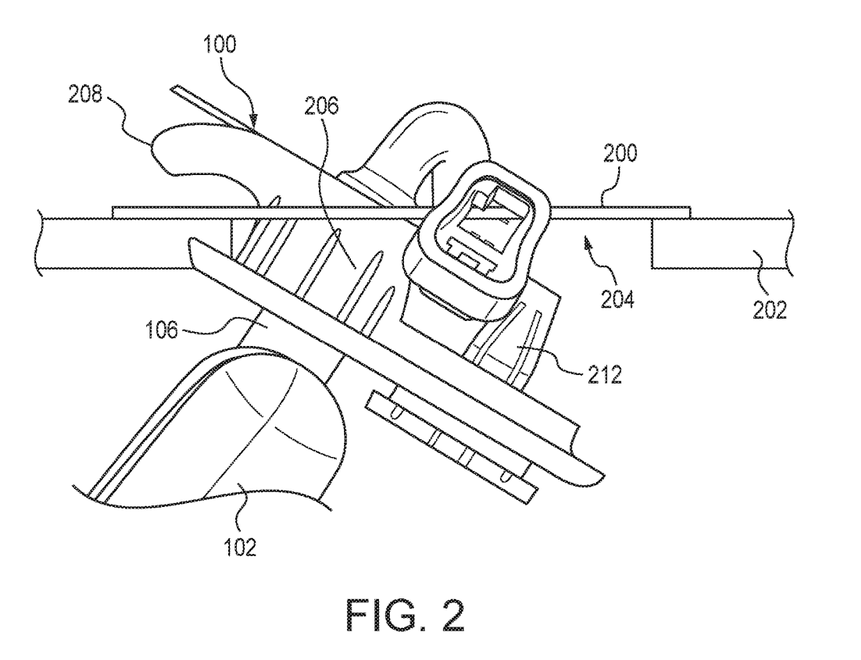
FIG. 2 is a side view of a mounting system for a sun visor during assembly.
Figure 3:
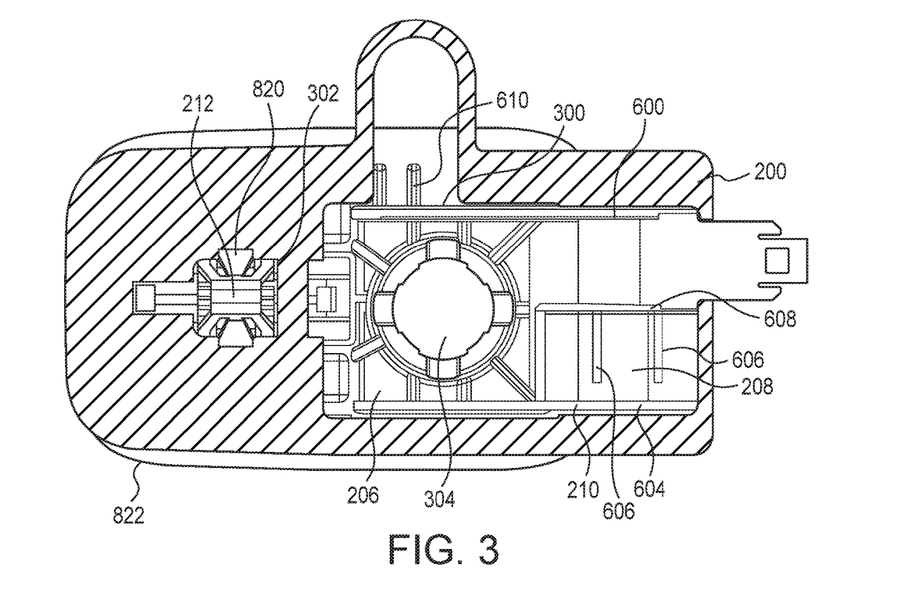
FIG. 3 is a top view of the mounting system in a roof rail of the motor vehicle.
Figure 4:
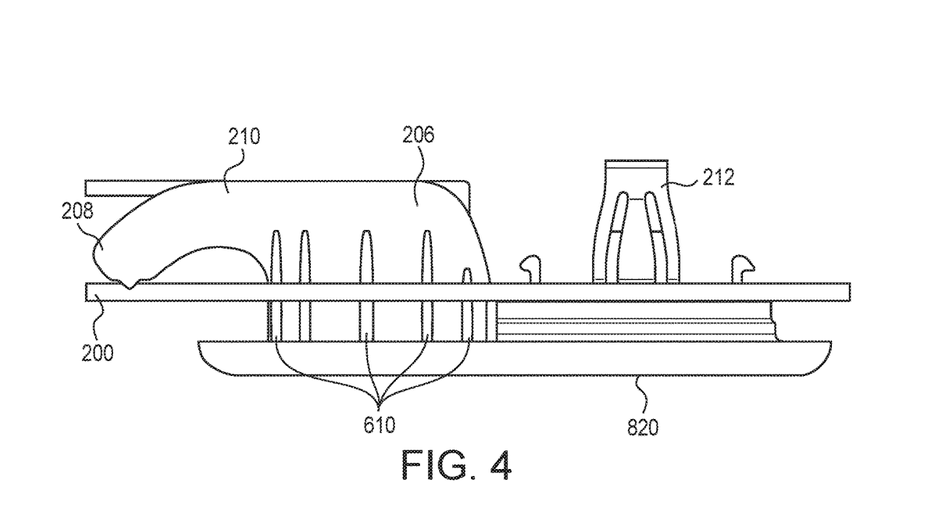
FIG. 4 is a side view of the mounting system in the roof rail of the motor vehicle.

Beginning with FIG. 2, the mounting system 100 of the sun visor 102 to the roof 104 will be disclosed. The roof 104 includes a roof rail 200, which is the structural front cross member of the roof 104, and a roof lining 202, which is the portion of the roof 104 visible to the user of the vehicle. FIG. 2 illustrates the mounting system 100, which is attached to the rod 106 of the sun visor 102, being inserted through a hole 204 in the roof lining 202 and into engagement with a portion of the roof rail 200. The mounting system 100 includes two roof engagement features for securing the sun visor 102 to the roof rail 200. The first engagement feature is a hook 208 that extends from a forward portion 210 of the base 206 of the mounting system 100. The hook 208 is inserted through the hole in the roof lining 202 and a first hole 300 in the roof rail 200, as shown in FIG. 3. After the hook 208 is inserted, the base 206 is rotated into a mounting location as illustrated in FIGS. 3-4. The hook 208 is rotated into contact with the roof rail 200, thereby providing an interference fit with the roof rail 200.

A second engagement feature for securing the mounting system 100 to the roof rail 200 is a clip 212 that is inserted into a second hole 302 in the roof rail 200 as illustrated in FIG. 3.

Figure 5:
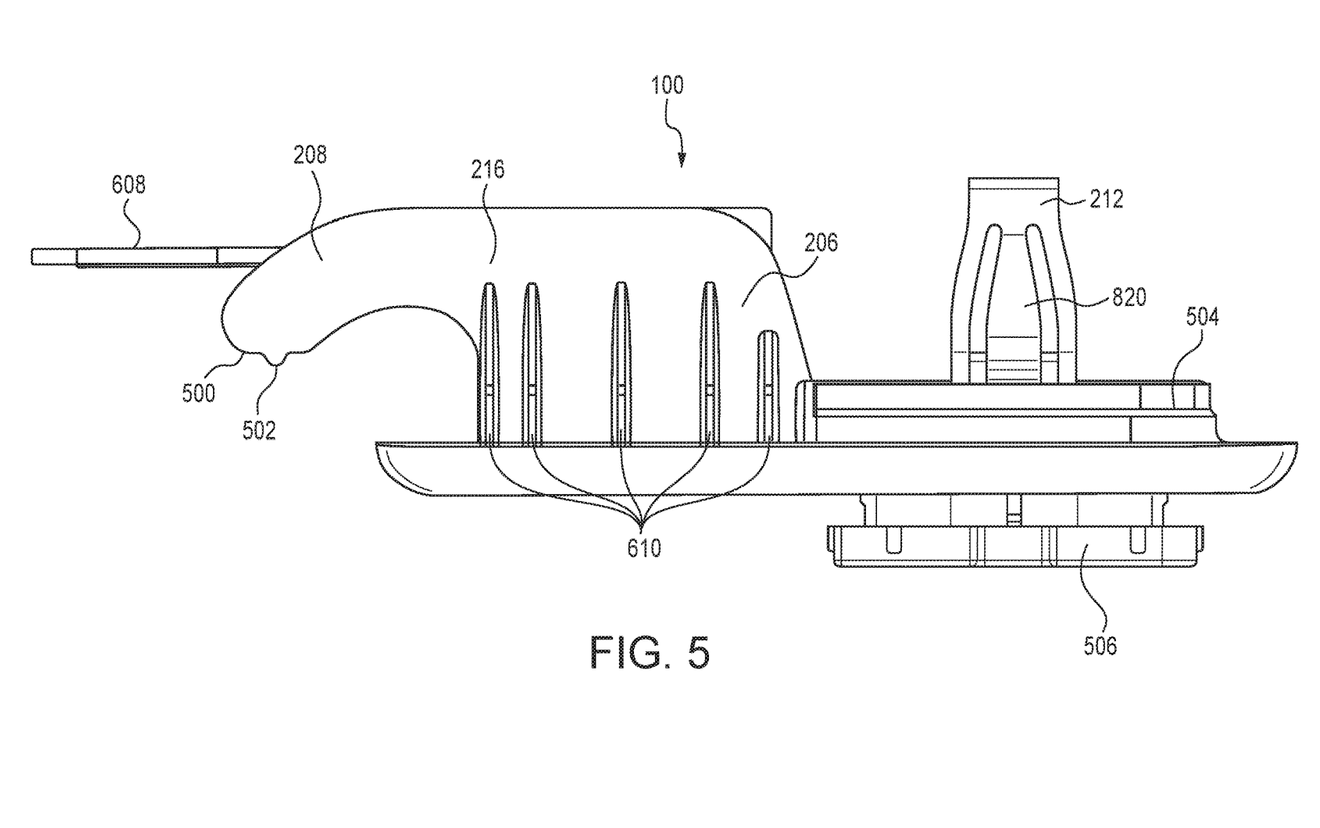
FIG. 5 is a side view of the mounting system in a pre-assembly stage.
Figure 6:
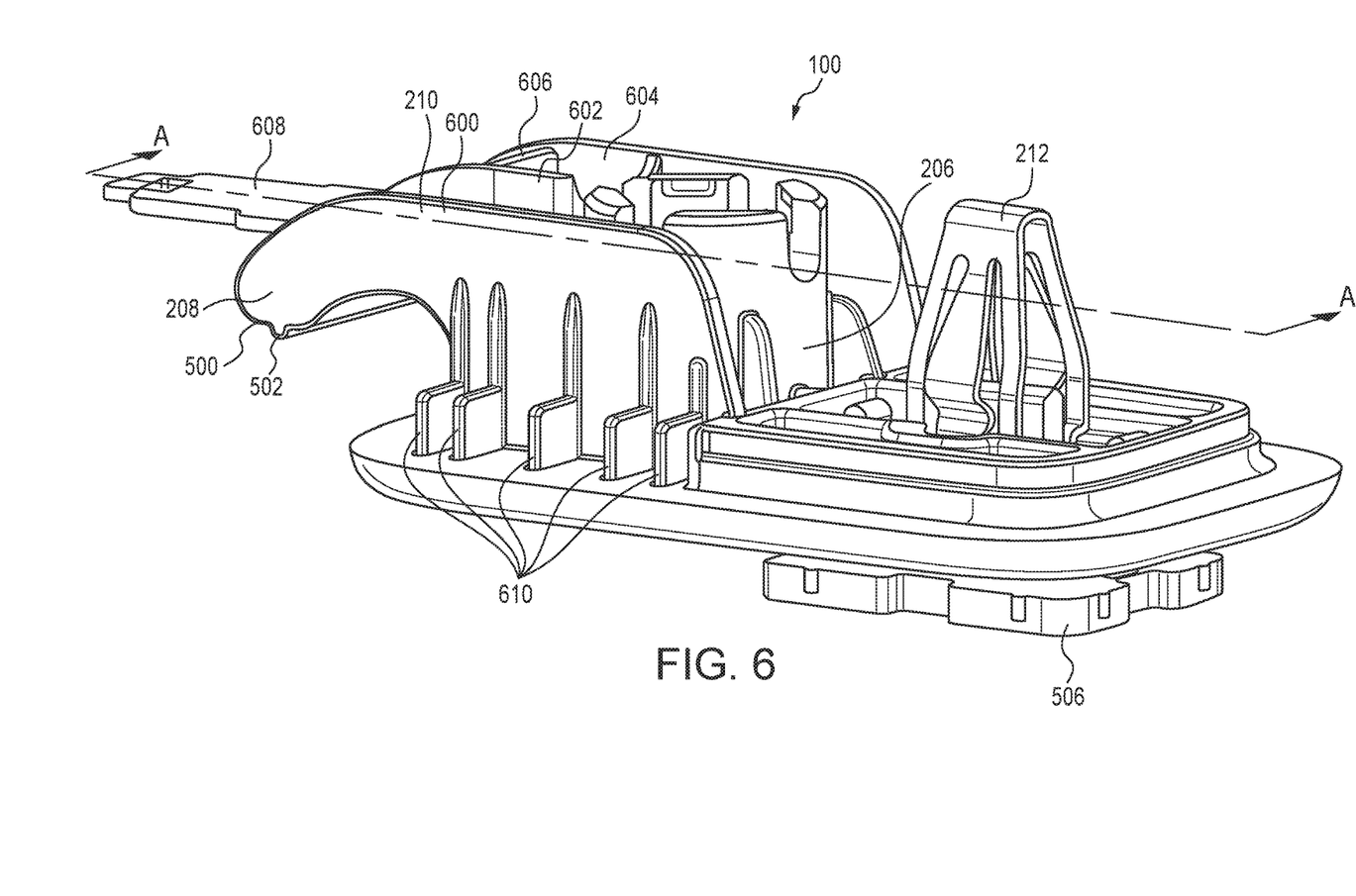
FIG. 6 is a rear perspective view of the mounting system in a pre-assembly stage.

The features and specifics of the mounting system 100 will be discussed in greater detail with reference to FIGS. 5-20 below. FIG. 5 is a side view and FIG. 6 is a rear perspective view of the mounting system 100. The base 206, as previously stated, has a forward portion 210 from which a hook 208 extends that engages with roof rail 200. The distal edge 500 of the hook 208 may include a non-smooth or ridged surface 502 to aid in creating an improved contact with the roof rail 200. As illustrated in FIG. 6, while the distal surface 500 may span the complete width of the hook 208 to maximize contact with the roof rail 200, the body of the hook 208 may be constructed from a number of ribs, such as longitudinal ribs 600, 602, 604, that form the body of the hook 208, and a number of lateral ribs 606 that provide additional structural support.

A tongue 608 may also extend longitudinally forward from the hook 208. The wiring harness 126, illustrated in FIG. 1, may be attached to the tongue 608, such as by providing a slot in the wiring harness 126 for receiving the tongue 608 in a mating fashion.

As illustrated in FIGS. 3-6, the base 206 may also include a plurality of laterally extending ribs 610 to provide additional support for the base 206, as well as to provide additional contact points with the roof rail 200 to provide a tight fit of the mounting system 100 when finally installed.

Figure 7:
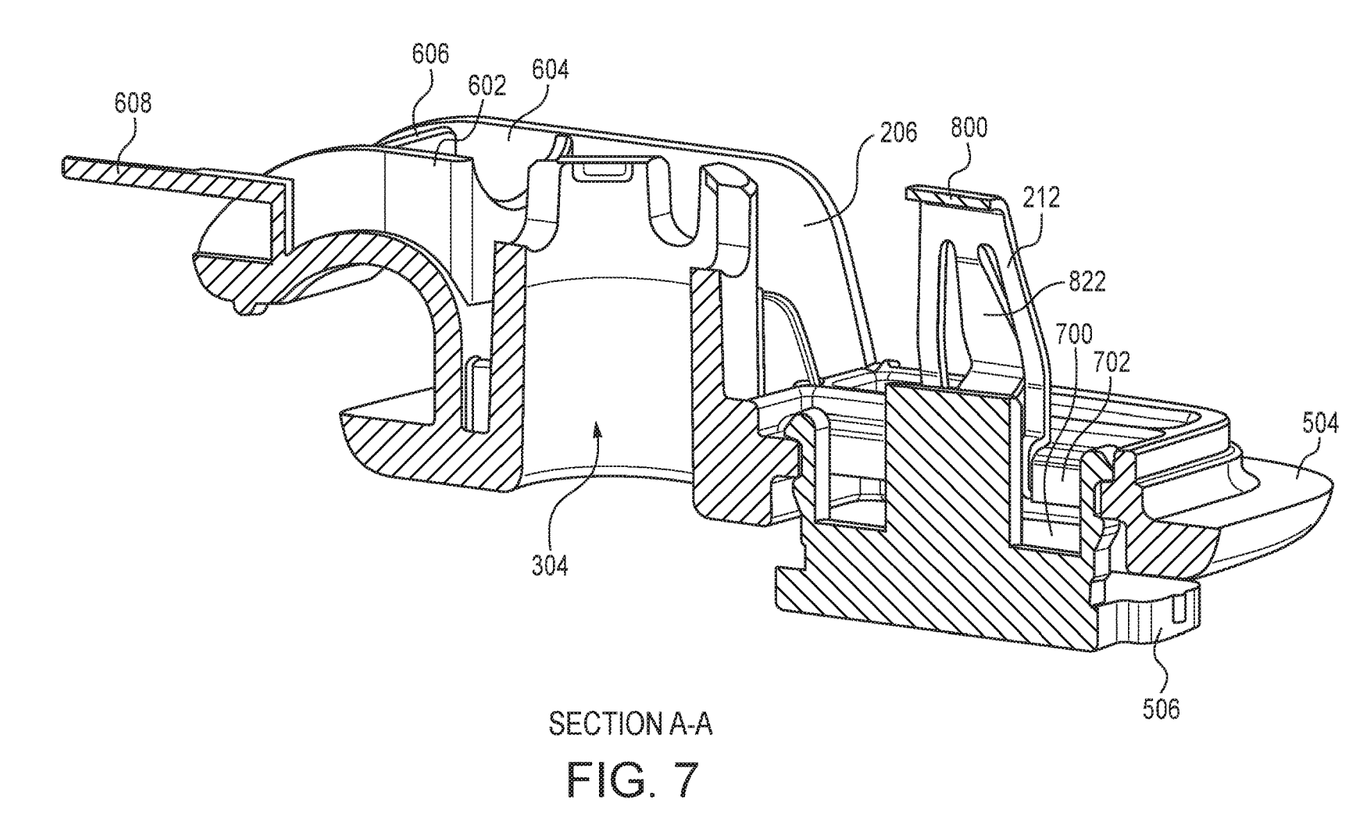
FIG. 7 is a cross-sectional view along line A-A of FIG. 6.

As illustrated in both FIG. 3 and FIG. 7, which is a section taken along line A-A of FIG. 6, the base 206 further include a hole 304 into which the rod 106 of the sun visor 102 is inserted. Wiring that runs from the wiring harness 126 may also be inserted within the rod 106 and supply lights around the mirror 114 with electrical power.

A rear portion 504 of the base 206 includes an aperture 700 in which a clip 212 and a cap 506 are inserted. The clip 212 is a second attachment point to the roof rail 200. The clip 212 attaches to both the inner edge 702 of the aperture 700, as shown in FIG. 7, and to the roof rail 200, as shown in FIGS. 3-4.

Figure 8:
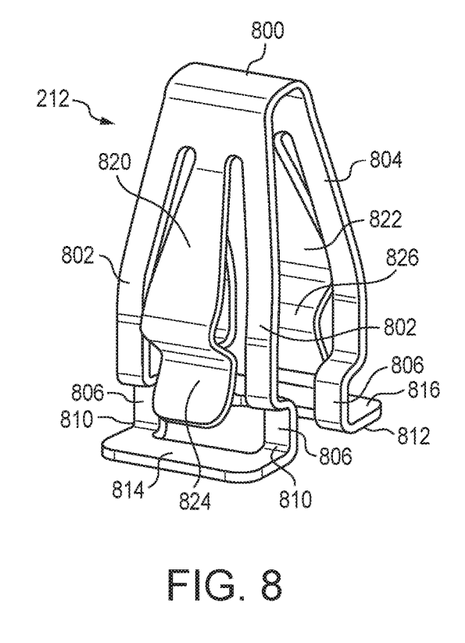
FIG. 8 is a perspective view of a clip for use in the mounting system.
Figure 9:
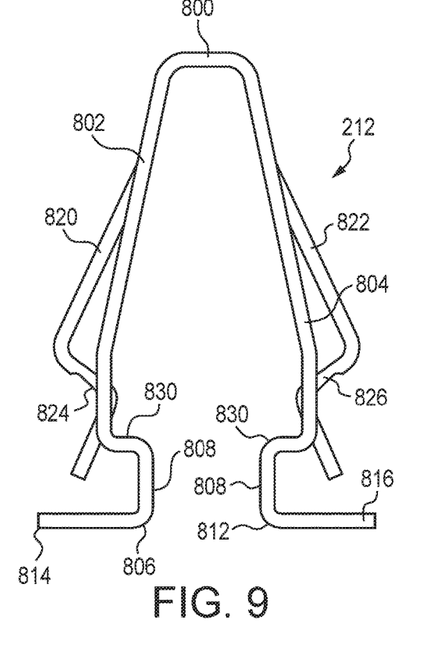
FIG. 9 is a side view of the clip of FIG. 8.
Figure 10:
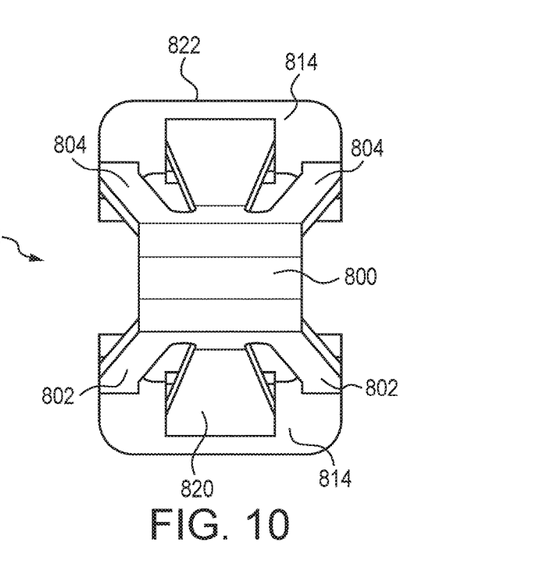
FIG. 10 is a top view of the clip of FIG. 8.
Figure 11:
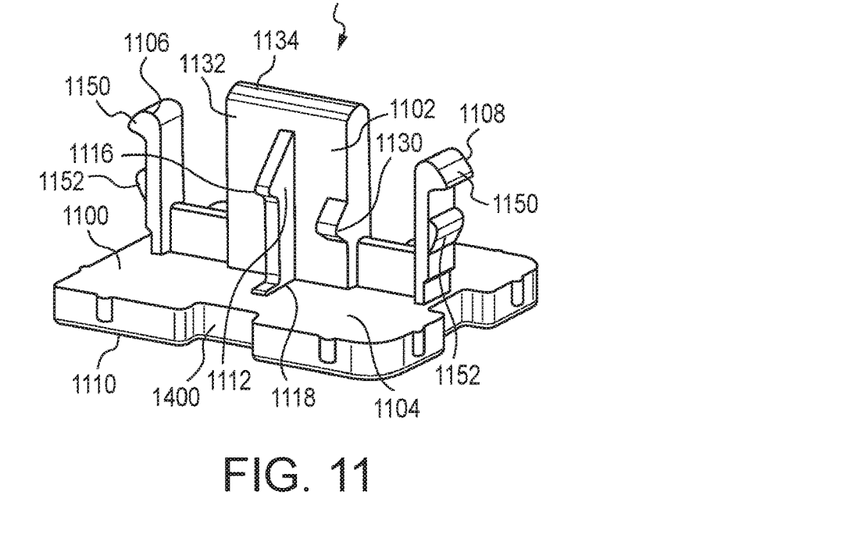
FIG. 11 is a perspective view of a cap for use in the mounting system.
Figure 12:
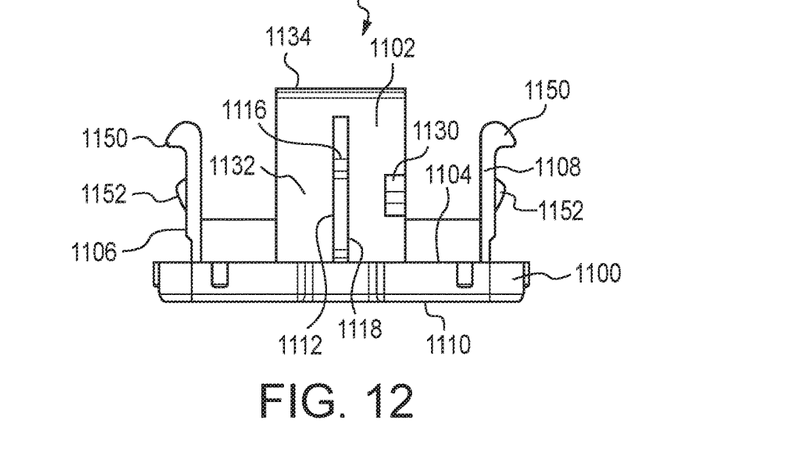
FIG. 12 is a side view of the cap of FIG. 11.
Figure 13:
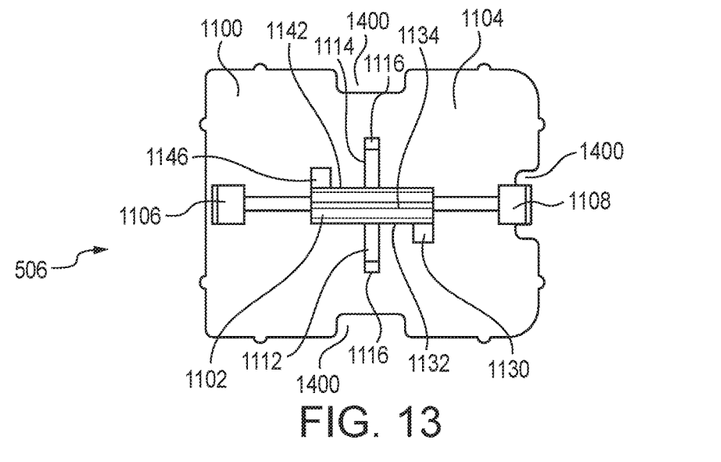
FIG. 13 is a top view of the cap of FIG. 11.
Figure 14:
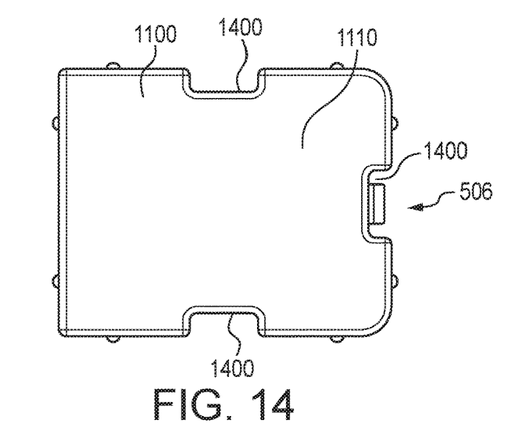
FIG. 14 is a bottom view of the cap of FIG. 11.
Figure 15:
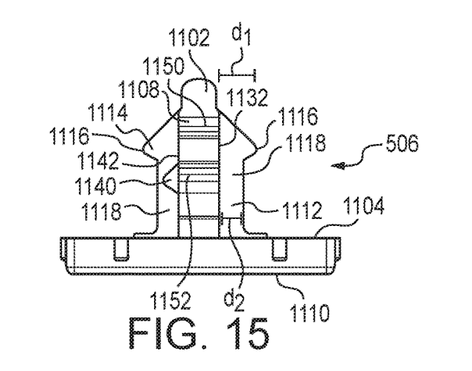
FIG. 15 is a front view of the cap of FIG. 11.
Figure 16:
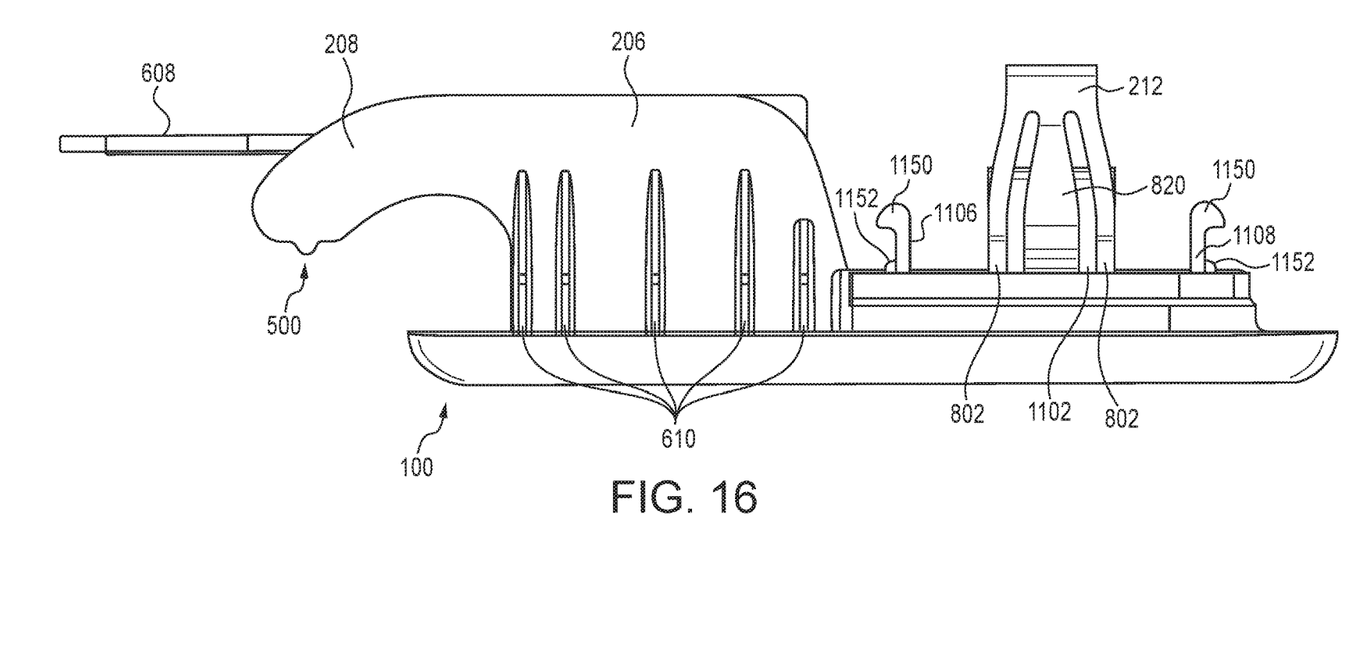
FIG. 16 is a side view of the mounting system in an assembled stage.

The clip 212 is shown in greater detail in FIGS. 8-10. The clip 212 may be constructed of a metal, rigid plastic material, or any suitable material known to one skilled in the art. The clip includes a top curved portion 800, from which a first pair of legs 802 extends on a first side of the top portion 800. A second pair of legs 804 extends from a second side the top portion 800 of the clip 212. Each of the pairs of legs 802, 804 extends outwardly and downwardly in a sloped fashion until each of the legs 802, 804 reach an incurvate lower section 806, 808. The outer surface of the clip 212 in the incurvate lower sections 806, 808 of the pairs of legs 802, 804 engage with the inner edge 702 of the aperture 700 in the base 206, which affixes the clip 212 to the base 206. At the distal ends 810, 812 of the pairs of legs 802, 804, a cross member 814, 816 may be present to connect each of the legs in the pair of legs 802, 804, providing stability to the clip 212.

Between each of the pair of legs 802, 804 a flexible tab member 820, 822 extends outwardly and downwardly from the top portion 800 of the clip 212. The flexible tab members 820, 822 are biased outwardly between the first and second pairs of legs 802, 804 into engagement with the roof rail 200. The flexible tab members 820, 822 may be pushed inward during installation of the clip 212, and spring outward when installation is completed. The flexible tab members 820, 822 have incurvate regions 824, 826 at the distal ends that engage and hold the clip 212 in engagement with the roof rail 200, effectively attaching the clip 212 to the roof rail 200. As the clip 212 is effectively attached to both the base 206 and the roof rail 200, the clip 212 therefore acts to attach the base 206 to the roof rail 212.

Figure 19:
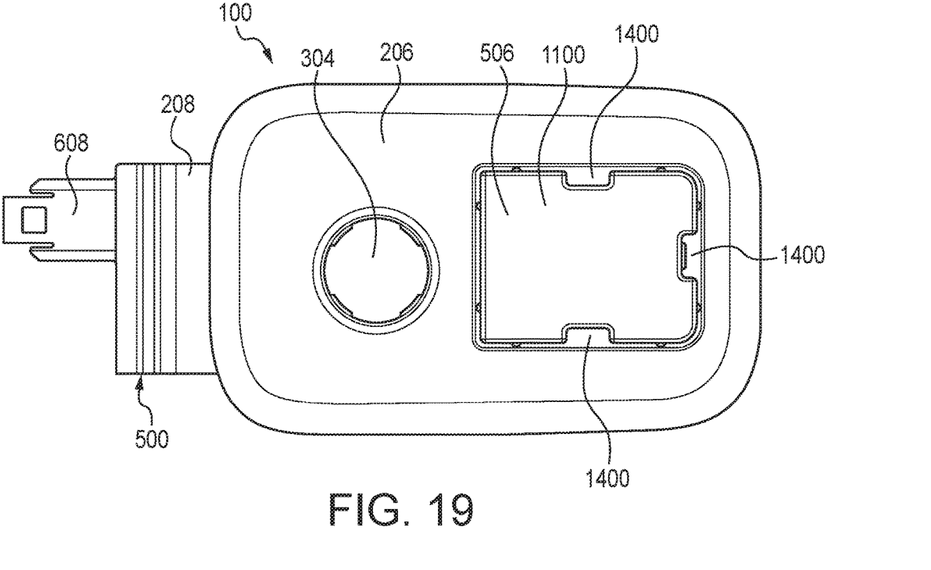
FIG. 19 is bottom view of the mounting system in the assembled stage.
Figure 20:
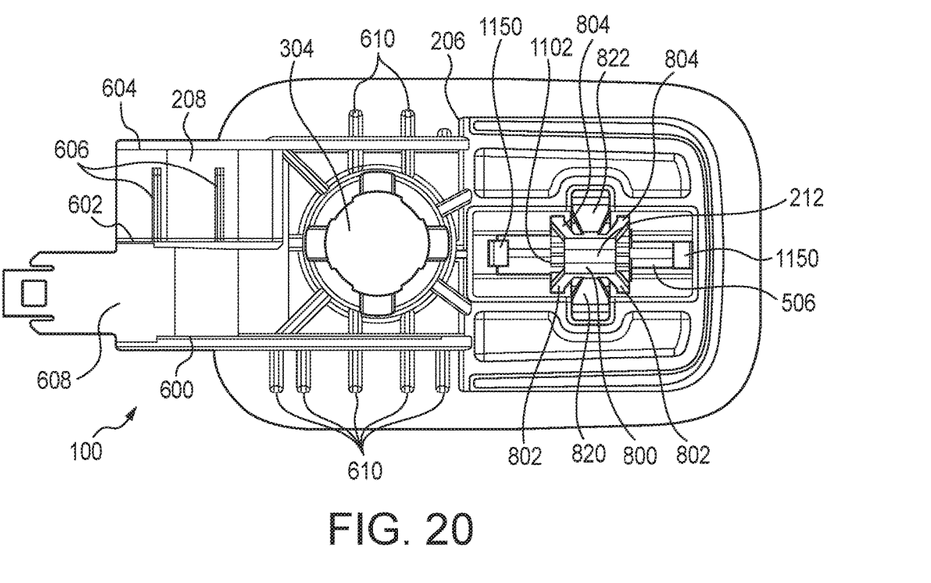
FIG. 20 is top view of the mounting system in the assembled stage.

FIGS. 11-15 illustrate a cap 506 that is insertable into the aperture 700 in the base 206 and the clip 212. The cap 506 includes a cap base 1100, a plunger 1102 extending from an inner surface 1104 of the cap 506, and two multi-tab clips 1106, 1108 extending upwardly from the inner surface 1104 of the cap base 1100 and located on opposite ends of the plunger 1102. As shown in FIG. 19, the outer surface 1110 of the cap base 1100 is flush with the base 206. The outer surface of the cap base 1100 can include an externally visible finish that matches the base 206 of the mounting system 100.

The plunger 1102 includes two sloped extensions 1112, 1114 that extend outwardly and slope outwardly and downwardly until each reaches an outward maximum 1116 a distance $d_1$ from the plunger 1102. Between the outward maximum 1116 and the cab base 1100, the sloped extensions 1112, 1114 have a rib portion 1118 that extends a distance $d_2$ from the plunger 1102, where $d_2$ is less than $d_1$. When the cap 506 is inserted fully into the aperture 700 in the base 206, as illustrated in FIGS. 16-20, the sloped extensions 1112, 1114 create an outward force on the tab members 820, 822 of the clip 212, holding them into engagement with the roof rail 200 and preventing the clip 212 and the base 206 from being removed from the mounting location in the roof rail 200, ensuring that the sun visor 102 is not accidentally removed by a user operating the sun visor 102.

The plunger 1102 also includes a first lateral extension 1130 that extends from an edge of a first side 1132 of the plunger 1102, approximately half way between the cap base 1100 and a distal end 1134 of the plunger 1102. A second lateral extension 1140 extends from an edge of the second side 1142 of the plunger 1102, also approximately half way between the cap base 1100 and the distal end 1134 of the plunger 1102. The first and second lateral extensions 1130, 1140 rest on the inner surfaces 830 one of each of the first and second pairs of legs 802, 804 of the clip 212, when the cap 506 is in an intermediate position as illustrated in FIGS. 5-7. The first and second lateral extensions 1130, 1140 prevent the cap 506 from being pulled out of clip 212 when the cap 506 is installed in this intermediate position.

The multi-tab clips 1106, 1108 of the cap 506 each have an outwardly extending sloped hook 1150 at the distal end of the multi-tab clips 1106, 1108 that creates a first interference surface and a retention tab 1152 extending from an outer side of the multi-tab clip 1106, 1108 at approximately half the distance between the cap base 1100 and the distal end of the multi-tab clip 1106, 1108 that creates a second interference surface. As illustrated in FIG. 7, each outwardly extending sloped hook 1150 engages the inner edge 702 of the aperture 700 when the cap 506 is in the intermediate position. The outwardly extending sloped hooks 1150 work in conjunction with the lateral extensions 1130, 1140 of the plunger 1102 to create an interference fit and prevent removal of the cap 506 when the cap 506 is in the intermediate position.

Figure 17:
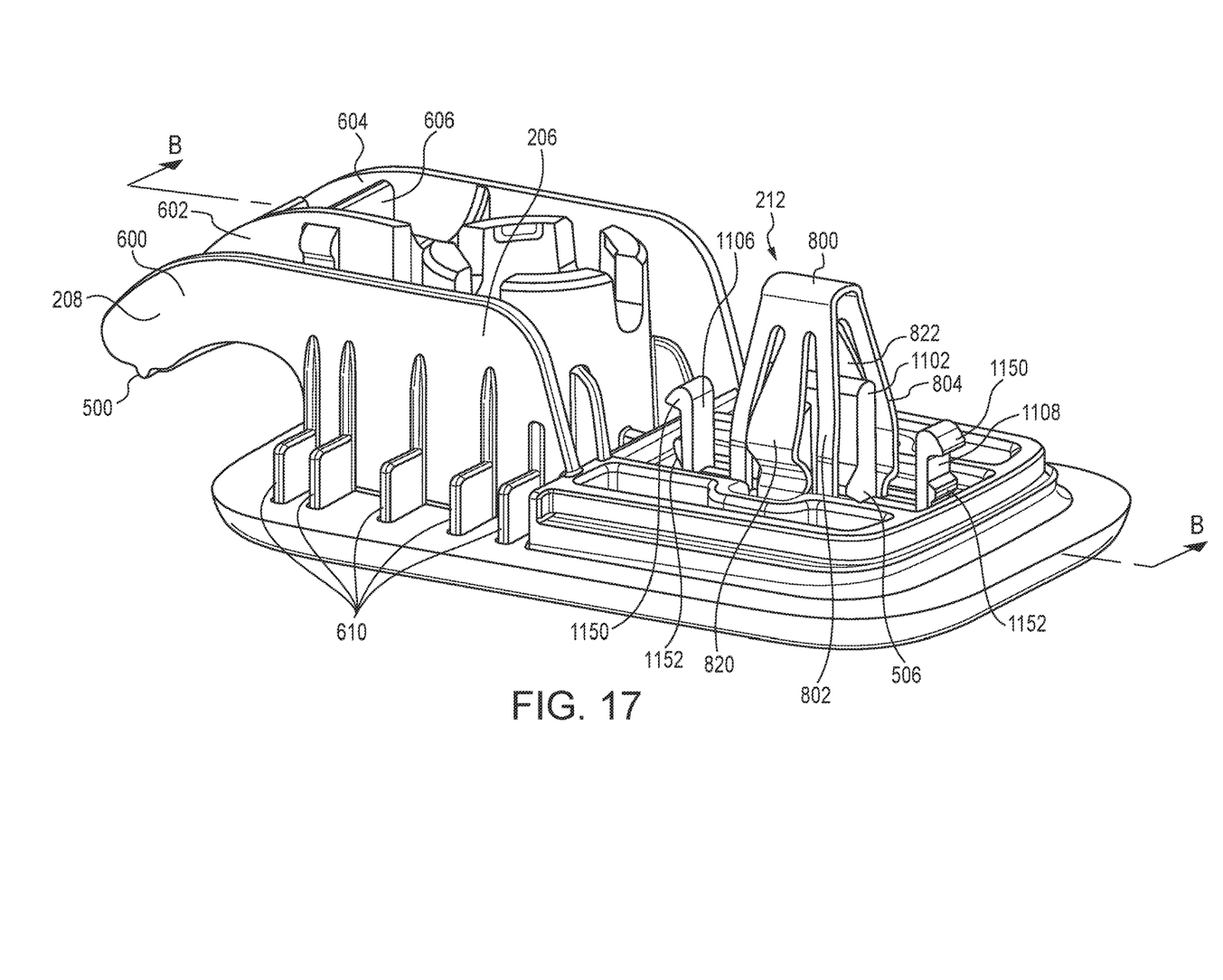
FIG. 17 is a perspective view of the mounting system in the assembled stage.
Figure 18:
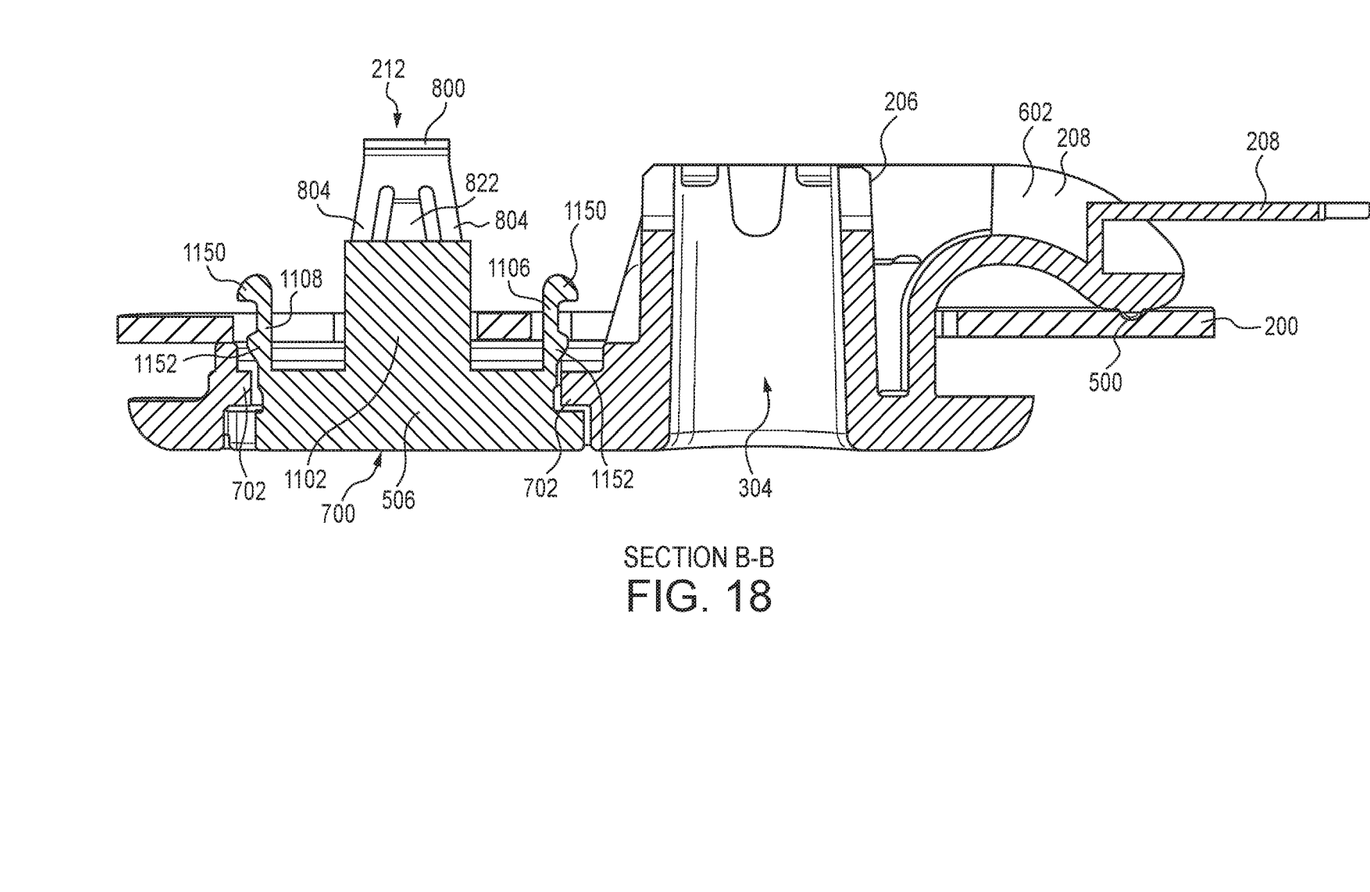
FIG. 18 is a cross-sectional view along line B-B of FIG. 17.

When final installation of the mounting system 100 is to be completed, the cap 506 may be pushed into the final position, as illustrated in FIGS. 16-20, by an installer in the assembly process. As illustrated in FIG. 17 and FIG. 18, which is a section taken along line B-B in FIG. 17, when the cap 506 is installed in the final position, the retention tabs 1152 are engaged with the inner edge 702 of the aperture 700 to create an interference fit and prevent removal of cap 506. The retention tabs 1152 hold the cap 506 in the final position, including the plunger 1102, which in turn holds the clip 212 in place. The clip 212 and the hook 208 extending from the base 206, therefore, provide a two-point mounting system 100 to hold the sun visor 102 in place in the roof rail 200 as illustrated in FIG. 3.

FIGS. 11-14 and 19 show that the bottom 1110 of the cap 506 may include one or more small slots 1400. A service technician may use a screw driver or similar tool to force the cap 506 out of the final position in event service is required. If the cap 506 is removed, the plunger 1102 is removed from engagement with the clip 212, and the flexible tab members 820, 822 may be moved inward to release the clip 212 from engagement with the roof rail 200. If the clip 212 is removed, the mounting system 100 may be removed by rotating the base 206 so the hook 208 is out of engagement with the roof rail 200 and the sun visor 102 is removed.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A mounting system for attaching an accessory to a body member of a motor vehicle, the body member having an inner edge defining an opening within the body member, comprising:
    a base inserted into the opening of the body member, comprising:
        a hook-shaped first engagement feature, the first engagement feature for engagement with the body member of the motor vehicle; and
        a base aperture;
    a clip disposed within the base aperture and the body member of the motor vehicle, the clip defining a second engagement feature, the clip comprising:
        a first pair of legs;
        a second pair of legs connected to the first pair legs at a top portion of the clip; and
        first and second flexible tab members extending from the top portion of the clip biased outwardly between the first and second pairs of legs into engagement with the inner edge of the body member; and
    a cap, comprising:
        a cap base;
        a plunger extending from a first side of the cap base, the plunger inserted into the base aperture and into the clip, the plunger abutting the flexible tab members, thereby maintaining the flexible tab members in engagement with the body member; and
        a first multi-tab clip extending from a first side of a bottom side of the cap, comprising:
            a first sloped hook at a distal end of the first multi-tab clip, the first sloped hook in engagement with the edge of the base aperture when the cap is in a first configuration, the first sloped hook creating an interference fit with the edge of the base aperture preventing accidental removal of the cap from the base; and
            a first retention tab located between the first sloped hook and the bottom side of the cap, the first retention tab in engagement with edge of the base aperture when the cap is in a second configuration, the first retention tab creating an interference fit with the edge of the base aperture preventing accidental removal of the cap from the base.

2. The system of claim 1 wherein each of the flexible tab members of the clip comprise:
    a first region extending downwardly and outwardly from the top portion of the clip; and
    a second region located at a distal end of the first region, the second region being generally incurvate, the second region of each of the flexible tab members engaging the inner edge of the body member.

3. The system of claim 2 wherein each of the first and second pair of legs of the clip comprise:
    sloped first portions extending outwardly and downwardly from the top portion of the clip;
    incurvate second portions having an inner surface and an outer surface, the outer surface engaging an edge of the base aperture, thereby connecting the clip to the base; and
    a cross member connecting the pair of legs.

4. The system of claim 3 wherein the cap further comprises:

a second multi-tab clip extending from a second side of the bottom side of the cap, comprising:
    a second sloped hook at a distal end of the second multi-tab clip, the second sloped hook in engagement with the edge of the base aperture when the cap is in a first configuration, the second sloped hook creating an interference fit with the edge of the base aperture preventing accidental removal of the cap from the base;
    a second retention tab located between the second sloped hook and the bottom side of the cap, the second retention tab in engagement with edge of the base aperture when the cap is in a second configuration, the second retention tab creating an interference fit with the edge of the base aperture preventing accidental removal of the cap from the base.

5. The system of claim 4 wherein the plunger further comprises:
    a first sloped extension extending laterally from a first side of the plunger, the first lateral extension engaging the first tab member when the cap is in a second configuration; and
    a second sloped extension extending laterally from a second side of the plunger, the second lateral extension engaging the second tab member when the cap is in a second configuration.

6. The system of claim 5 wherein the plunger further comprises:
    a lateral extension extending laterally from a first side of the plunger, the lateral extension engaging the inner surface of one of the first pair of legs, the lateral extension creating an interference fit with the incurvate second portion of the one of the first pair of legs when the cap is in the second configuration; and
    wherein the lateral extension prevents the cap from being accidentally removed.

7. The system of claim 6 further comprising:
    a plurality of stiffening members extending laterally from the first engagement feature.

8. A mounting system for attaching an accessory to a body member of a motor vehicle, the body member having an inner edge defining an opening within the body member, comprising:
    a base inserted into the opening of the body member having a base aperture;
    a clip disposed within the base aperture and the body member of the motor vehicle, the clip comprising:
        a first pair of legs;
        a second pair of legs connected to the first pair legs at a top portion of the clip; and
        first and second flexible tab members extending from the top portion of the clip biased outwardly between the first and second pairs of legs into engagement with the inner edge of the body member; and
    a cap, comprising:
        a cap base;
        a plunger extending from a first side of the cap base, the plunger inserted into the base aperture and into the clip, the plunger abutting the flexible tab members, thereby maintaining the flexible tab members in engagement with the body member; and
        a first multi-tab clip extending from a first side of a bottom side of the cap, comprising:
            a first sloped hook at a distal end of the first multi-tab clip, the first sloped hook in engagement with the edge of the base aperture when the cap is in a first configuration, the first sloped hook creating an interference fit with the edge of the base aperture preventing accidental removal of the cap from the base; and
            a first retention tab located between the first sloped hook and the bottom side of the cap, the first retention tab in engagement with edge of the base aperture when the cap is in a second configuration, the first retention tab creating an interference fit with the edge of the base aperture preventing accidental removal of the cap from the base.

9. The system of claim 8 wherein each of the flexible tab members of the clip comprise:
    a first region extending downwardly and outwardly from the top portion of the clip; and
    a second region located at a distal end of the first region, the second region being generally incurvate, the second region of each of the flexible tab members engaging the inner edge of the body member.

10. The system of claim 9 wherein each of the first and second pair of legs of the clip comprise:
    sloped first portions extending outwardly and downwardly from the top portion of the clip;
    incurvate second portions having an inner surface and an outer surface, the outer surface engaging an edge of the base aperture, thereby connecting the clip to the base; and
    a cross member connecting the pair of legs.

11. The system of claim 10 wherein the cap further comprises:
    a second multi-tab clip extending from a second side of the bottom side of the cap, comprising:
        a second sloped hook at a distal end of the second multi-tab clip, the second sloped hook in engagement with the edge of the base aperture when the cap is in a first configuration, the second sloped hook creating an interference fit with the edge of the base aperture preventing accidental removal of the cap from the base;
        a second retention tab located between the second sloped hook and the bottom side of the cap, the second retention tab in engagement with edge of the base aperture when the cap is in a second configuration, the second retention tab creating an interference fit with the edge of the base aperture preventing accidental removal of the cap from the base.

12. The system of claim 11 wherein the plunger further comprises:
    a first sloped extension extending laterally from a first side of the plunger, the first lateral extension engaging the first tab member when the cap is in a second configuration; and
    a second sloped extension extending laterally from a second side of the plunger, the second lateral extension engaging the second tab member when the cap is in a second configuration.

13. The system of claim 12 wherein the plunger further comprises:
    a lateral extension extending laterally from a first side of the plunger, the lateral extension engaging the inner surface of one of the first pair of legs, the lateral extension creating an interference fit with the incurvate second portion of the one of the first pair of legs when the cap is in the second configuration; and
    wherein the lateral extension prevents the cap from being accidentally removed.

14. A method of attaching an accessory to a body member of a motor vehicle, the body member having an inner edge defining an opening within the body member, comprising the steps of:
   inserting a base having a hook-shaped first engagement feature and a base aperture into opening with the body member;
   rotating the first engagement feature in engagement with the body member of the motor vehicle;
   inserting a clip into the base aperture and the body member of the motor vehicle, the clip defining a second engagement feature; and
   inserting a cap into a first position of the base, the cap comprising a cap base, a plunger extending from a central portion of a first side of the cap base, and at least one multi-tab clip extending from an edge portion of the first side of the cap base, the at least one multi-tab clip having an interference surface at a distal end of the at least one multi-tab clip, wherein the interference surface of the at least one multi-tab clip abuts the inner edge of the body member to prevent removal of the cap.

15. The method of claim 14 wherein the step of inserting the clip in the base aperture and the body member further comprises the steps of:
   engaging an inner edge of the base aperture with a first pair of legs and a second pair of legs connected to the first pair legs at a top portion of the clip; and
   engaging the inner edge of body member with first and second flexible tab members extending from the top portion of the clip biased outwardly between the first and second pairs of legs into engagement with the inner edge of the body member.

16. The method of claim 15 further comprising the step of:
   moving a cap from a first position to a second position, the cap comprising a cap base and a plunger extending from a central portion of a first side of the cap base.

17. The method of claim 16 further comprising the step of inserting the plunger into the base aperture and into the clip, the plunger abutting the flexible tab members, thereby maintaining the flexible tab members in engagement with the body member.

* * * * *